United States Patent
Schneider

(10) Patent No.: US 11,945,511 B2
(45) Date of Patent: Apr. 2, 2024

(54) FRONT FLOOR REINFORCEMENT STRUCTURE FOR A VEHICLE HAVING A BATTERY PACK IN THE TUNNEL

(71) Applicant: ArcelorMittal, Luxembourg (LU)

(72) Inventor: Nicolas Schneider, Saint-Martin Longueau (FR)

(73) Assignee: ArcelorMittal, Luxembourg (LU)

(*) Notice: Subject to any disclaimer, the term of this patent is extended or adjusted under 35 U.S.C. 154(b) by 286 days.

(21) Appl. No.: 17/311,741

(22) PCT Filed: Nov. 25, 2019

(86) PCT No.: PCT/IB2019/060110
§ 371 (c)(1),
(2) Date: Jun. 8, 2021

(87) PCT Pub. No.: WO2020/128682
PCT Pub. Date: Jun. 25, 2020

(65) Prior Publication Data
US 2022/0024523 A1    Jan. 27, 2022

(30) Foreign Application Priority Data

Nov. 25, 2019 (WO) .................. PCT/IB2018/060168

(51) Int. Cl.
*B62D 25/20* (2006.01)
*B60K 1/04* (2019.01)
*B62D 21/15* (2006.01)

(52) U.S. Cl.
CPC ................ *B62D 25/20* (2013.01); *B60K 1/04* (2013.01); *B60K 2001/0438* (2013.01);
(Continued)

(58) Field of Classification Search
CPC .... B62D 25/20; B62D 25/2036; B62D 21/15; B60K 1/04; B60K 2001/0438; B60Y 2306/01
(Continued)

(56) References Cited

U.S. PATENT DOCUMENTS 5,921,618 A * 7/1999 Mori .................. B62D 25/2036
296/203.03
2005/0189791 A1   9/2005 Chernoff et al.
(Continued)

FOREIGN PATENT DOCUMENTS

CN    102137785 A    7/2011
CN    105992702 A    10/2016
(Continued)

OTHER PUBLICATIONS

See Search Report of PCT/IB2019/060110 dated Feb. 17, 2020.
(Continued)

*Primary Examiner* — Amy R Weisberg
*Assistant Examiner* — Dana D Ivey
(74) *Attorney, Agent, or Firm* — Davidson, Davidson & Kappel, LLC

(57) ABSTRACT

A design and a production method of a front floor reinforcement structure 1 for a vehicle 3 having a battery pack 5 in the tunnel 7 designed to improve the energy absorption of the vehicle during a side impact by involving the front floor panel 11 in the energy absorption during the side impact. The front floor reinforcement structure 1 includes a front floor cross member 13 having a non-deformable portion 14 located on the end of the front floor cross member 13 closest to the side sill 9 and a deformable portion 16 located on the end of the front floor cross member 13 closest to the tunnel 7. The resistance to plastic deformation of the non-deformable portion 14 is greater than the resistance to plastic
(Continued)

deformation of the deformable portion 16, which is itself greater than the resistance to plastic deformation of the front floor panel 11.

14 Claims, 5 Drawing Sheets

(52) U.S. Cl.
 CPC .......... *B60Y 2306/01* (2013.01); *B62D 21/15* (2013.01); *B62D 25/2036* (2013.01)

(58) Field of Classification Search
 USPC .................................................... 296/203.01
 See application file for complete search history.

(56) References Cited

U.S. PATENT DOCUMENTS

| | | |
|---|---|---|
| 2011/0210582 A1 | 9/2011 | Mori et al. |
| 2012/0049501 A1 | 3/2012 | Fujii et al. |
| 2012/0118653 A1 | 5/2012 | Ogihara et al. |
| 2012/0251862 A1 | 10/2012 | Kano et al. |
| 2012/0282487 A1 | 11/2012 | Ogawa et al. |
| 2013/0026786 A1 | 1/2013 | Saeki et al. |
| 2013/0088044 A1 | 4/2013 | Charbonneau et al. |
| 2015/0239504 A1 | 8/2015 | Lohmann et al. |
| 2016/0090003 A1 | 3/2016 | Hirota et al. |
| 2016/0159406 A1 | 6/2016 | Qu et al. |
| 2016/0288636 A1 | 10/2016 | Kamimura et al. |
| 2017/0029031 A1 | 2/2017 | Yang et al. |
| 2018/0065676 A1 | 3/2018 | Yoshida et al. |
| 2018/0229777 A1 | 8/2018 | Yang et al. |
| 2018/0362089 A1 | 12/2018 | Viux et al. |

FOREIGN PATENT DOCUMENTS

| | | | |
|---|---|---|---|
| CN | 108367781 A | 8/2018 | |
| DE | 102010045997 A1 | 11/2011 | |
| EP | 2230156 A1 | 9/2010 | |
| EP | 2487090 A2 | 8/2015 | |
| FR | 3024421 A1 | 2/2016 | |
| JP | H04221279 A | 8/1992 | |
| JP | 2001018848 A | 1/2001 | |
| JP | 2010215092 A | 9/2010 | |
| JP | 2010247717 A | 11/2010 | |
| JP | 2013133043 A | 7/2013 | |
| RU | 2489272 C1 | 8/2013 | |
| RU | 2536008 C2 | 12/2014 | |
| WO | WO2011055844 A1 | 5/2011 | |
| WO | WO2016020593 A1 | 2/2016 | |
| WO | WO2017098305 A1 | 6/2017 | |
| WO | WO-2017098305 A1 * | 6/2017 | .......... B62D 21/157 |
| WO | WO 2018/162943 A1 | 9/2018 | |

OTHER PUBLICATIONS

Pascal Dietsch et al. in "Methodology to assess fracture during crash simulation: fracture strain criteria and their calibration", in Metallurgical Research Technology vol. 114, No. 6, 2017.

* cited by examiner

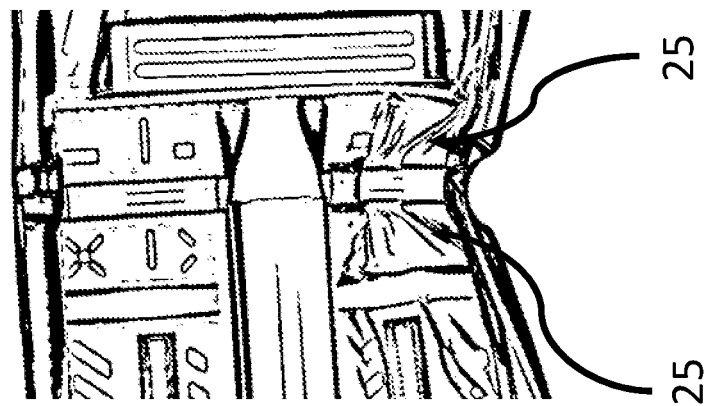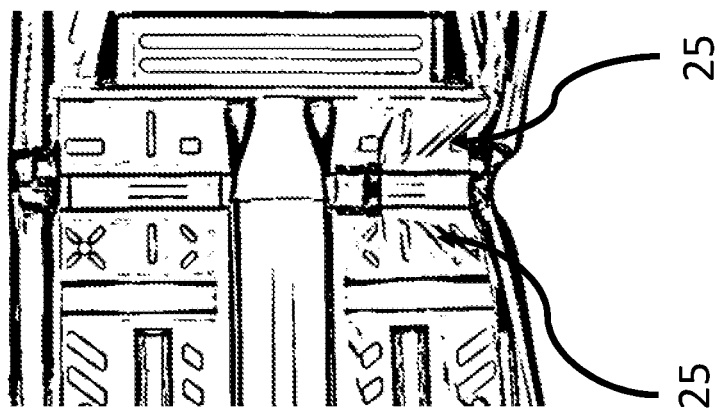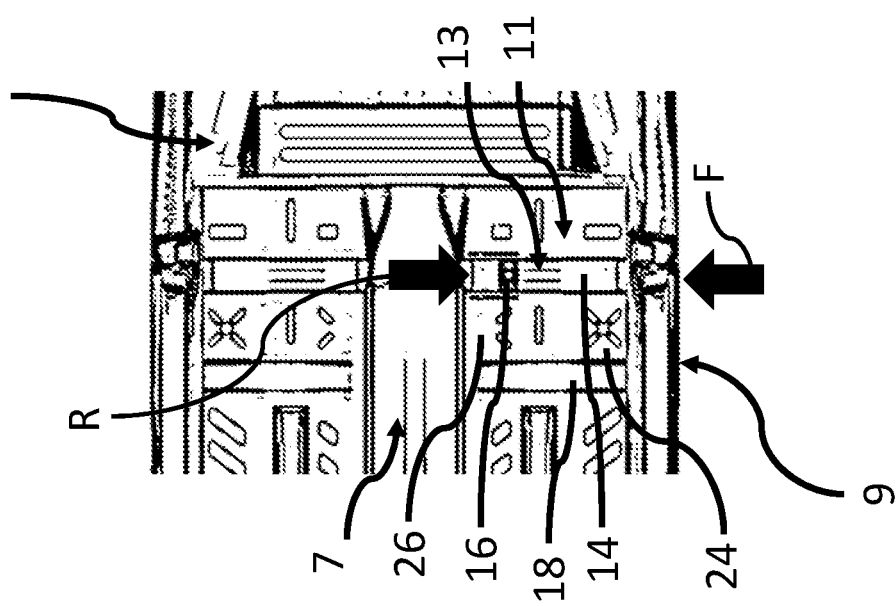

FRONT FLOOR REINFORCEMENT STRUCTURE FOR A VEHICLE HAVING A BATTERY PACK IN THE TUNNEL

The present invention relates to a front floor reinforcement structure of a vehicle having a battery pack in the tunnel. The present invention further relates to a method for producing such a front floor reinforcement structure.

The front floor reinforcement structure comprises a front floor panel, at least one front floor cross member, a side sill and a tunnel.

The front floor cross member is a structural part attached to the front floor of the vehicle, extending in a transversal direction from the side sill of the vehicle to the tunnel of the vehicle. It is designed to reinforce the structure of the vehicle in terms of overall rigidity and in case of a side impact. There can be several front floor cross members in a vehicle: because the front floor cross member spans half of the width of a vehicle, there are usually at least two front floor cross members on the left and right of the tunnel, usually aligned in the transverse direction to form a pair. Furthermore, there can be several said pairs of cross members along the length of a vehicle, located for example beneath the front seats or at the level of the B-pillar.

The present invention more specifically relates to the front floor reinforcement structure of an electric vehicle or of a hybrid vehicle, in which the volume of the tunnel of the vehicle is occupied by a battery pack. The tunnel is a hollow recess located in the front floor reinforcement structure of the passenger compartment, which houses the exhaust system in a traditional combustion engine vehicle. In the present case, we consider a hybrid or a fully electric vehicle, in which the volume inside the tunnel is occupied by at least a part of the battery pack serving to power the electrical motor or motors of the vehicle.

When the vehicle is involved in a crash, the vehicle structure is expected to protect the occupants by avoiding intrusion of the impactor into the passenger compartment, which is known as the anti-intrusion role of the structure, and by absorbing the mechanical energy of the crash through mechanical deformation of the structure, which is known as the energy absorption role of the structure.

The front floor reinforcement structure is involved in the behavior of the vehicle more specifically during a crash in which the impactor comes into contact with the side of the vehicle, here after referred to as a side impact. Such a side impact is described in various standardized crash tests such as for example the EuroNCAP Pole Side Impact, in which the vehicle is impacted on its side by a fixed pole having a relative initial velocity at the time of impact of 32 km/h. Another standardized side impact test is the EuroNCAP Advanced European Mobile Deformable Barrier (AE-MDB) Side Impact, in which the vehicle is impacted on its side by a 1300 kg standardized barrier spanning part of the length travelling at a speed of 50 km/h.

BACKGROUND

It is known from the prior art to design the front floor reinforcement structure in such a way that the front floor cross member acts as an anti-intrusion part in the case of a side impact. The front floor cross member can also have a limited contribution to energy absorption during the side impact by deforming in a limited and controlled way.

SUMMARY OF THE INVENTION

However, the front floor panel itself is not significantly involved in the protection of the occupants during a crash. One of the aims of the present invention is to overcome this limitation of the front floor reinforcement structure by providing a front floor reinforcement structure which makes use of the front floor panel to increase energy absorption during a side impact.

The present invention relates to a front floor reinforcement structure for a vehicle having a battery pack in the tunnel comprising at least:
- a front floor panel,
- a front floor cross member extending in a transverse direction from the side sill to the tunnel and being attached at least to the front floor panel, said front floor cross member comprising a non-deformable portion located on the end of the front floor cross member closest to the side sill and a deformable portion located on the end of the front floor cross member closest to the tunnel, the resistance to plastic deformation of the non-deformable portion being greater than the resistance to plastic deformation of the deformable portion and the resistance to plastic deformation of said deformable portion being greater than the resistance to plastic deformation of said front floor panel.

By applying the invention, the energy absorbed by the front floor reinforcement structure during a side impact will be increased thanks to the stretching deformation of a large surface area of the front floor panel. Thus, the front floor panel, which is an already existing part of any vehicle, is given an additional function of energy absorption during a side impact. By conferring an additional role to this already existing part, the present invention can be applied to reduce the weight of a vehicle and/or to reduce the manufacturing costs of a vehicle and/or to increase the safety of a vehicle.

According to other optional features of the front floor reinforcement structure according to the invention, considered alone or according to any possible technical combinations:
- the front floor cross member consists only of the deformable portion and the non-deformable portion,
- the non-deformable portion of the front floor cross member has a length, as measured in the transverse direction, comprised in the range of 40% to 90% of the total length of the front floor cross member,
- the non-deformable portion of the front floor cross member comprises a reinforced non-deformable portion located at the end of the non-deformable portion closest to the side sill and a non-reinforced non-deformable portion located at the end of the non-deformable portion closest to the tunnel, wherein the resistance to plastic deformation of said reinforced non-deformable portion is greater than the resistance to plastic deformation of said non-reinforced non-deformable portion,
- the non-deformable portion of the front floor cross member has an ultimate tensile strength of at least 1300 MPa,
- the deformable portion of the front floor cross member has a tensile strength of at least 500 MPa, a fracture strain of at least 0.6 and a critical bending angle of at least 75°,
- the front floor cross member is hot stamped from a steel tailor welded blank,
- the front floor cross member is hot stamped from a steel tailor rolled blank,
- the front floor panel has a yield strength of at least 210 MPa,
- the front floor reinforcement structure further comprises a side sill reinforcement part, located above the front floor cross member and extending in a transverse direction from the side sill toward the tunnel, wherein said side sill reinforcement part is attached to the side sill, the front floor reinforcement structure further comprises a tunnel reinforcement part, located above the front floor cross member and extending in a transverse direction from the tunnel toward the side sill, wherein said tunnel reinforcement part is attached to the tunnel, The present invention further concerns a method for producing the front floor reinforcement structure according to the invention comprising the steps of:

providing a front floor panel,
providing a tunnel,
providing a side sill,
providing at least one front floor cross member,
attaching said tunnel, said side sill, and said front floor cross member to said front floor panel.

According to other optional features of the method according to the invention, considered alone or according to any possible technical combinations, the method further comprises the steps of:

providing a side sill reinforcement part and attaching said side sill reinforcement part to the side sill,
providing a tunnel reinforcement part and attaching said tunnel reinforcement part to the tunnel.

BRIEF DESCRIPTION OF THE DRAWINGS

Other aspects and advantages of the invention will appear upon reading the following description, given by way of example, and made in reference to the appended drawings, wherein:

FIGS. 5A, 5B and 5C is a series of three top views of the front floor reinforcement structure according to the invention taken from a numerical simulation of a EuroNCAP Pole Side Impact. FIG. 5A shows the situation before impact, FIG. 5B shows the situation 30 ms after impact, FIG. 5C shows the situation 65 ms after impact.

DETAILED DESCRIPTION

In the following description, the terms "above", "below", "lower", "upper, "front", "rear", "transverse", "transversal" and "longitudinal" are defined according to the usual directions of a mounted vehicle. More particularly, the terms "above", "below", "lower" and "upper" are defined according to the elevation direction of the vehicle, the terms "front", "rear" and "longitudinal" are defined according to the front/rear direction of the vehicle and the terms "transversal" and "transverse" are defined according to the width of the vehicle. The terms "right-hand side" and "left-hand side" are defined according to the referential of an occupant of the vehicle, who is facing towards the normal forward driving direction of the vehicle. By "substantially parallel" or "substantially perpendicular" it is meant a direction which can deviate from the parallel or perpendicular direction by no more than 15°.

More particularly, the terms "fracture strain" and "critical bending angle" refer to the fracture strain criterion and the critical bending angle criterion defined by Pascal Dietsch et al. in "Methodology to assess fracture during crash simulation: fracture strain criteria and their calibration", in Metallurgical Research Technology Volume 114, Number 6, 2017. The critical bending angle defines the angle at which the first cracks are detected on the extrados of a sample which has been deformed according to the standardized VDA-238-100 Standard. The fracture strain is the associated equivalent strain within the material at the deformation point when the critical bending angle has been reached.

The term "controlled buckling" refers to the mode of deformation of a part subjected to a compressive load, where the part progressively absorbs the mechanical energy of the compressive load by forming a series of successive waves resulting from successive local buckling deformations of the part. As a result, the length of the part as measured in the direction of the compressive load is smaller after the deformation than the initial length of the part in said direction. In other words, when a part reacts to a compressive load by controlled buckling, it folds onto itself in the same way as a plastic bottle on which a compressive load is applied between the top and the bottom of the bottle.

Figure 1:
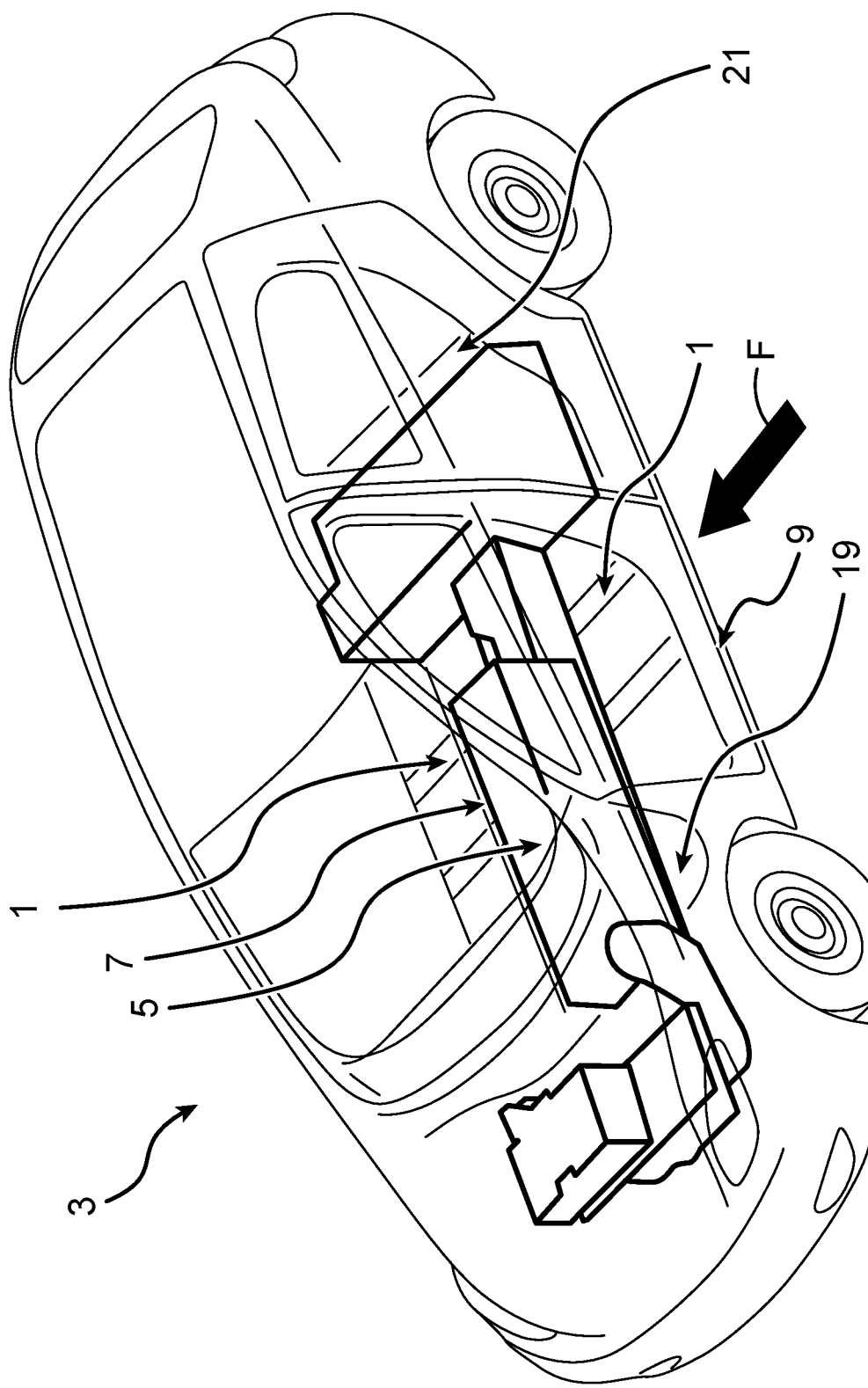
FIG. 1 is an overall perspective view of a vehicle according to the invention.

Referring to FIG. 1, a front floor reinforcement structure 1 for a hybrid or electrical vehicle 3 having a battery pack 5 in the tunnel 7 is described.

Figure 2:
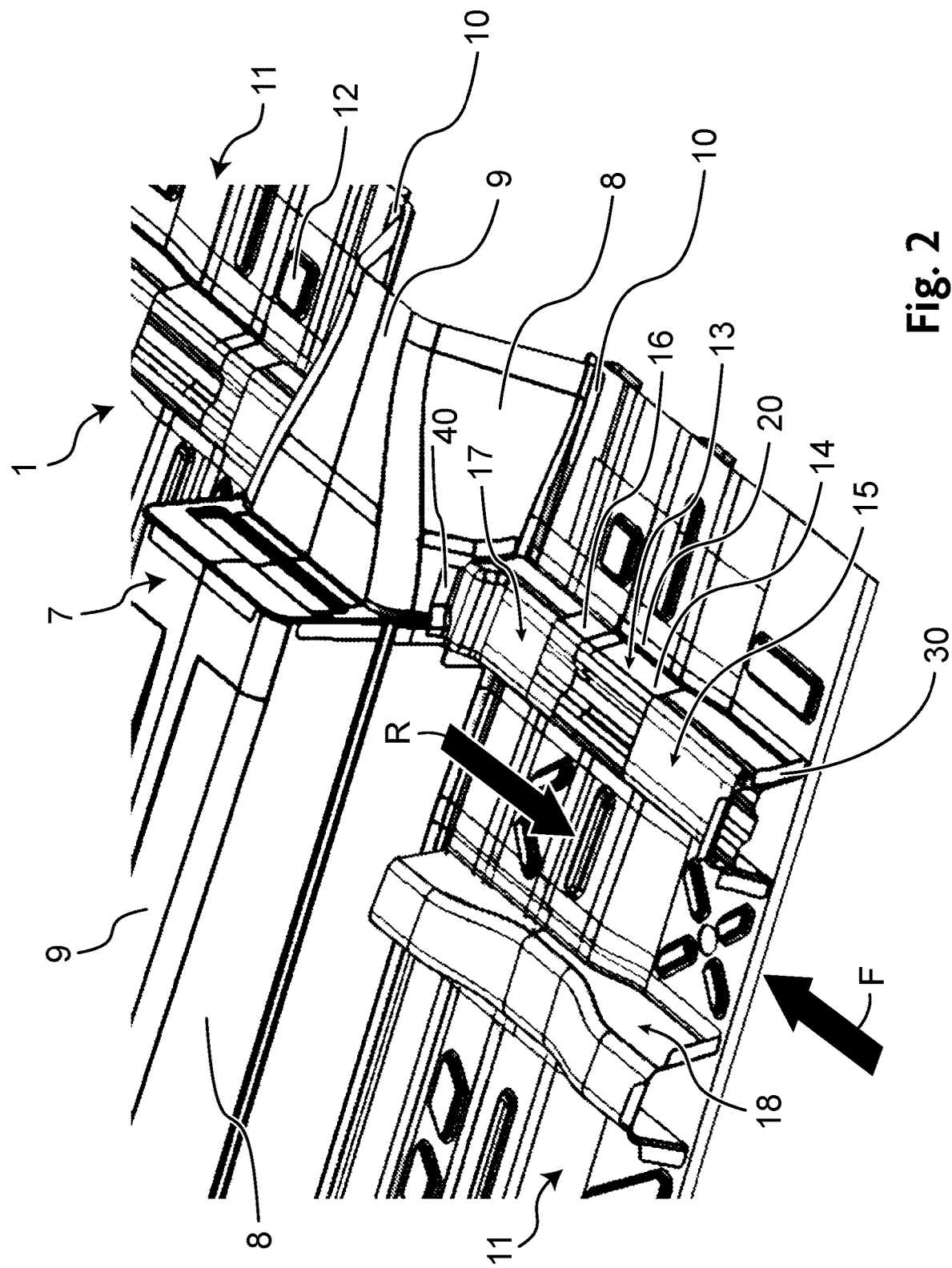
FIG. 2 is a perspective view from above of a portion of the front floor reinforcement structure according to the invention.
Figure 4:
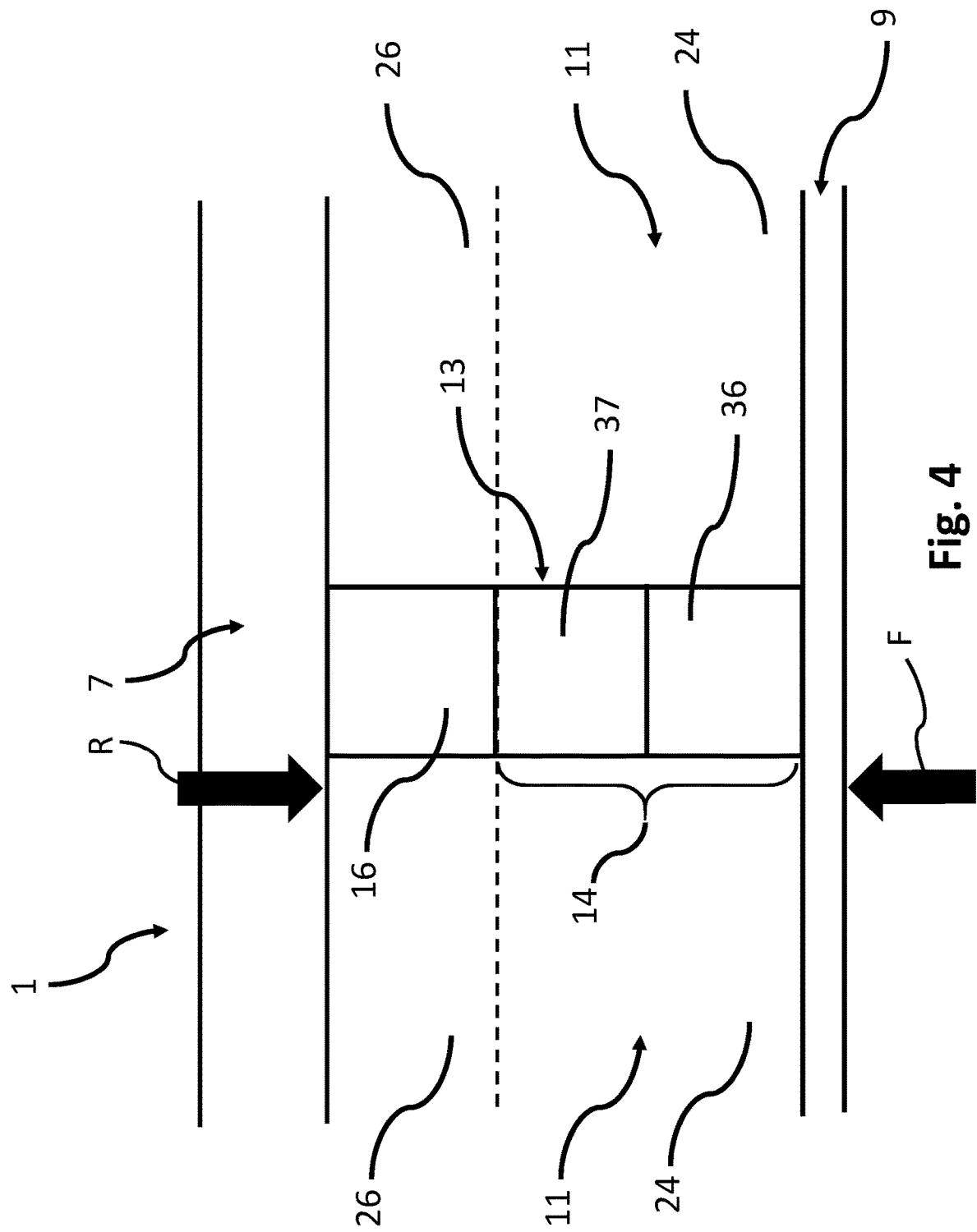
FIG. 4 is a top view of a portion of the front floor reinforcement structure according to the invention.

Referring to FIG. 2 and FIG. 4, the front floor reinforcement structure 1 comprises a front floor panel 11 and a front floor cross member 13. According to a particular embodiment depicted in FIG. 2, the front floor reinforcement structure 1 further comprises a side sill reinforcement part 15. According to a particular embodiment depicted in FIG. 2, the front floor reinforcement structure 1 further comprises a tunnel reinforcement part 17.

Figure 3:
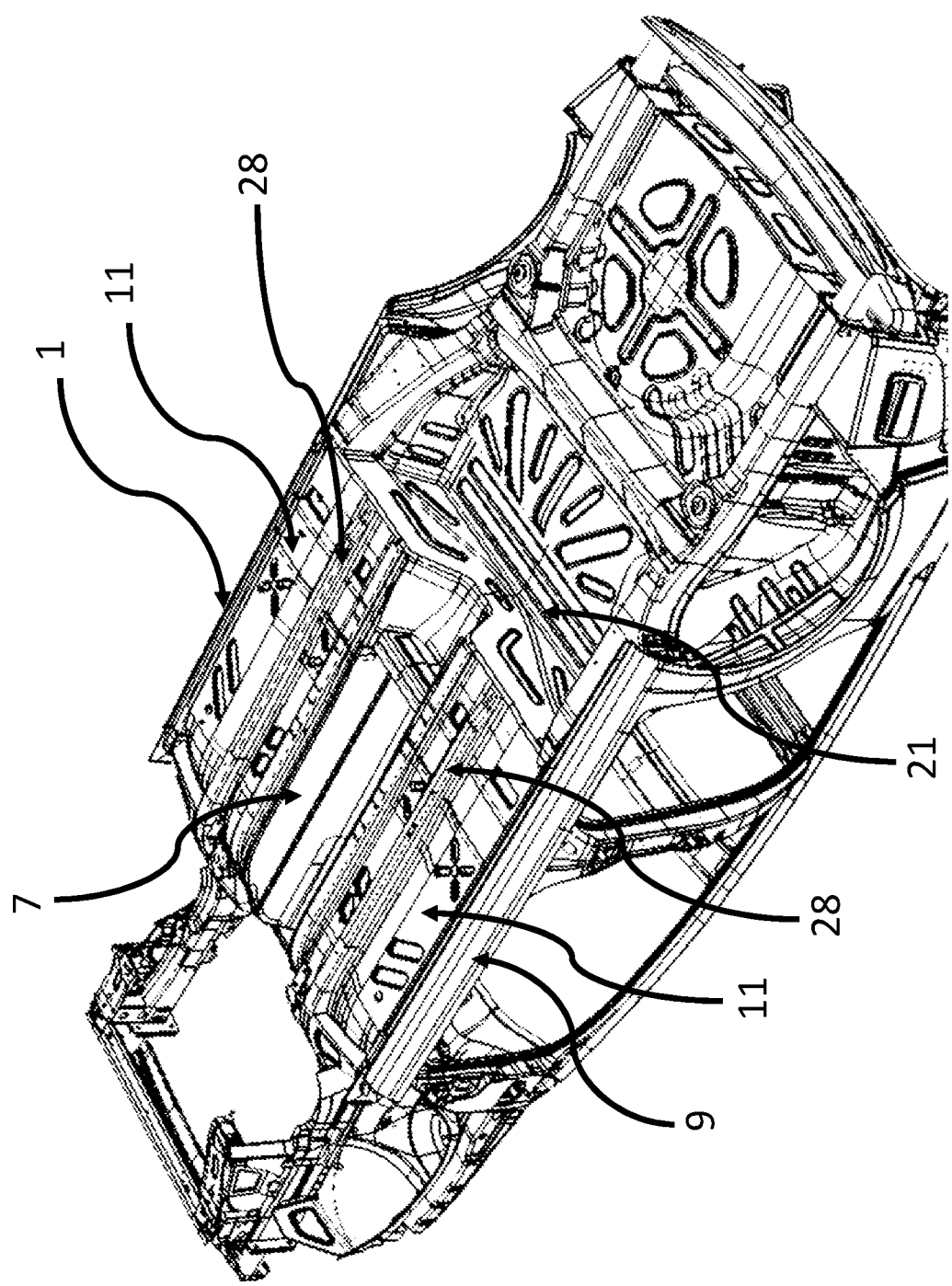
FIG. 3 is a perspective view from below of a portion of the front floor reinforcement structure according to the invention (note that the battery pack is not depicted in this figure)

Referring to FIGS. 3 and 4, the side sill 9 is located on the side of the vehicle and extends longitudinally along the side of the vehicle. The side sill 9 is for example made of several parts assembled together.

Referring to FIGS. 1, 2, 3 and 4, the tunnel 7 is located in the middle of the passenger compartment in the transverse direction and closes the central bottom area of said passenger compartment. The tunnel 7 extends longitudinally from the dash panel 19 to the rear floor reinforcement structure 21. It comprises two vertical walls 8 and a horizontal top wall 9. According to a particular embodiment, the tunnel 7 further comprises tunnel flanges 10 on either side to assemble said tunnel 7 to the rest of the vehicle structure. According to a particular embodiment, as depicted on FIG. 2, the tunnel 7 can comprise several different horizontal top walls 9, located at different elevations, to optimize the space inside the inner volume of the tunnel and inside the passenger compartment. According to a particular embodiment, not depicted in the attached figures, the tunnel 7 further comprises at its front end a portion known as the tunnel nose, which comprises an upward bent portion of the horizontal top wall 9. According to a particular embodiment, as depicted on FIG. 2, the vertical walls 8 of the tunnel taper to form a narrower tunnel inner volume toward the rear of the vehicle, in order to optimize the space inside the inner volume of the tunnel and inside the passenger compartment. The tunnel 7 can be made of a single part or of several parts manufactured separately and assembled together, for example by spot welding.

The battery pack 5 inside the tunnel 7 comprises one or several battery cells and a battery pack structure. The battery cells are designed to store and provide electrical energy to run the electrical motor or motors of the vehicle. The battery pack structure is designed to isolate the battery cells from the exterior environment and from the vehicle passenger compartment both for safety reasons and in order to offer optimal atmospheric and temperature conditions to ensure the good functioning of the battery cells. The battery pack structure also has the roles of protecting the battery cells in case of an impact and of ensuring a good fixture of the battery pack to the vehicle body. The battery pack 5 is attached to the vehicle body for example by mechanical bolting of a battery pack tray to the vehicle structure. The battery pack 5 has a significant mass, for example in the order of 200 kg.

Referring to FIGS. 1, 2 and 3, the front floor panel 11 is a generally flat panel closing the bottom of the front part of the passenger compartment of the vehicle and extending from the front of the passenger compartment toward the rear of the passenger compartment. According to a particular embodiment, the front floor panel 11 comprises front floor panel ribs 12, designed to increase its rigidity.

The front floor panel 11 is made of two separate panels located on either side of the tunnel 7 and is attached for example by spot welding or by Laser welding on each of its four sides respectively to the dash panel 19 at the front of the passenger compartment, the rear floor reinforcement structure 21 at the rear, the side sill 9 and the tunnel 7. In a particular embodiment, the front floor panel 11 is attached to the tunnel 7 by welding it on the flange 10 of said tunnel 7. In a particular embodiment, the front floor panel 11 is not directly attached to the side sill 9 or the tunnel 7, but rather attached to an intermediate connecting part, not depicted in the attached figures, said connecting part being itself attached to the side sill 9 or to the tunnel 7.

According to a particular embodiment, the front floor panel 11 is further attached to at least one reinforcement element 18 designed to ensure the overall rigidity of the vehicle and to protect the vehicle occupants in case of an impact. Said transverse reinforcement element 18 is attached to the front floor panel 11, for example by spot welding or by Laser welding for example above said front floor panel 11, as depicted on FIG. 2.

According to a particular embodiment, the front floor panel 11 is further attached to at least one longitudinal reinforcement element 28 designed to ensure the overall rigidity of the vehicle and to protect the vehicle occupants in case of an impact. Said longitudinal reinforcement element 28 are attached to the front floor panel 11, for example by spot welding or by Laser welding, for example below said front floor panel 11 as depicted on FIG. 3.

Referring to FIGS. 2 and 4, the front floor cross member 13 is located above the front floor panel 11 and extends in a substantially transverse direction from the side sill 9 to the tunnel 7. The front floor cross member 13 is attached to the front floor panel 11, for example by spot welding cross member flanges 20 of the front floor cross member 13 to the front floor panel 11. The front floor cross member 13 and the front floor panel 11 define together a front floor cross member inner volume, which is closed on its lower side by the front floor panel 11 and on its upper, front and rear sides by the front floor cross member 13. The front floor cross member 13 is adjacent on one side to the side sill 9 and on another side to the tunnel 7, however, it does not necessarily touch the side sill 9 or the tunnel 7.

It should be noted that on FIG. 2 and FIG. 4, the front floor cross member 13 which is depicted is located on the left-hand side of the vehicle. However, all the description is also valid for a symmetrical front floor cross-member 13 located on the right-hand side of the vehicle.

The front floor cross member 13 comprises a non-deformable portion 14 located on the end of the front floor cross member 13 closest to the side sill 9 and a deformable portion 16 located on the end of the front floor cross member 13 closest to the tunnel 7. The resistance to plastic deformation of the non-deformable portion 14 is greater than the resistance to plastic deformation of the deformable portion 16. Furthermore, the resistance to plastic deformation of the deformable portion 16 is greater than the resistance to plastic deformation of the front floor panel 11. For example, in order to obtain a greater resistance to plastic deformation, the product of the yield strength of the non-deformable portion 14 by the thickness of said non-deformable portion 14 is greater than the product of the yield strength of the deformable portion 16 by the thickness of said deformable portion 16, which is itself greater than the product of the yield strength of the front floor panel 11 by the thickness of said front floor panel 11.

According to a particular embodiment, as depicted in FIG. 4, the cross member non-deformable portion 14 further comprises a reinforced non-deformable portion 36 extending in a transverse direction from the end of the front floor cross member 13 located closest to the side sill 9 and a non-reinforced non-deformable portion 37 extending from the end of said reinforced non-deformable portion 36 to the end of said cross member deformable portion 16. The resistance to plastic deformation of said reinforced non-deformable portion 36 is greater than the resistance to plastic deformation of said non-reinforced non-deformable portion 37. For example, the product of the yield strength of said reinforced non-deformable portion 36 by the thickness of said reinforced non-deformable portion 36 is greater than the product of the yield strength of said non-reinforced non-deformable portion 37 by the thickness of said non-reinforced non-deformable portion 37.

Referring to FIG. 4, the front floor panel 11 comprises a side sill panel portion 24, defined as the portion of the surface of the front floor panel 11 spanning from the side sill 9 to a line perpendicular to the front floor cross member 13 and crossing said front floor cross member 13 at the end of the non-deformable portion 14 located farthest away from the side sill 9. The front floor panel 11 further comprises a tunnel panel portion 26, defined as the portion of the surface of the front floor panel 11 spanning from the tunnel 7 to a line perpendicular to the front floor cross member 13 and crossing said front floor cross member 13 at the end of the deformable portion 16 located farthest away from the tunnel 7.

According to a particular embodiment, depicted in FIG. 2, the front floor reinforcement structure 1 further comprises a side sill reinforcement part 15 which extends above the front floor cross member 13 from the side sill 9 in a transverse direction toward the tunnel 7. The side sill reinforcement part 15 is attached to the side sill 9 for example by welding on side sill reinforcement flanges 30 of said side sill reinforcement part 15. According to a particular embodiment, the side sill reinforcement part 15 is further attached to the front floor cross member 13, for example by welding it on to the cross member flanges 20. According to a particular embodiment, the side sill reinforcement part 15 is further attached to the front floor panel 11 for example by welding.

According to a particular embodiment, depicted in FIG. 2, the front floor reinforcement structure 1 further comprises a tunnel reinforcement part 17 which extends above the front floor cross member 13 from the tunnel 7 in a transverse direction toward the side sill 9. The tunnel reinforcement part 17 is attached to the tunnel 7 for example by welding on tunnel reinforcement flanges 40 of said side tunnel reinforcement part 17. According to a particular embodiment, the tunnel reinforcement part 17 is further attached to the front floor cross member 13, for example by welding it on to the cross member reinforcement flanges 20. According to a particular embodiment, the tunnel reinforcement part 17 is further attached to the front floor panel 11 for example by welding.

During a side impact, the vehicle structure is submitted to an impact force F exerted on the side of the vehicle and following a substantially transverse direction toward the tunnel 7. Under the effect of the compressive impact force F, the front floor reinforcement structure 1 is submitted to a compressive load resulting from the combined effect of the impact force F on the side sill 9 and the reaction force R to said impact force F exerted by the tunnel 7. Because the tunnel 7 contains a battery pack 5 having an important mass, for example 200 kg, the tunnel 7 exhibits a very high mechanical inertia which generates a very high reaction force R, comparable in strength to the impact force F. On the other hand, it should be noted that in the case of a vehicle having a generally hollow tunnel 7, such as for example a traditional combustion engine vehicle having no battery pack 5 in the tunnel 7, the tunnel 7 will have a very low mechanical inertia. In such a case, the tunnel 7 will be deformed under the effect of the impact force F and will not generate a significant reaction force R. As a result, when there is no battery pack 5 in the tunnel 7, the front floor reinforcement structure 1 will not be submitted to a significant compressive load during a side impact.

In the case of a tunnel 7 housing a battery pack 5, under the influence of said compressive load, the deformable portion 16 will deform by controlled buckling, while the non-deformable portion 14 will generally retain its initial shape and will hardly be deformed by the compressive load. In such a way, the front floor cross member 13 advantageously acts both as an anti-intrusion part and as an energy absorption part.

Referring to FIGS. 5A, 5B and 5C, the aforementioned design of the front floor cross member 13 according to the current invention presents the further advantage of absorbing part of the energy of the impact by stretching part of the front floor panel 11. Said stretching of the front floor panel 11 is evidenced on the crash test simulation results depicted in FIGS. 5B and 5C by the formation of folds 25, extending within the side sill panel portion 24 of the front floor panel 11 in a direction which is not substantially perpendicular to the impact force F. Indeed, the formation of folds in a direction substantially perpendicular to the impact force F would denote a purely compressive deformation of the front floor panel 11, which would absorb a very low amount of energy. On the other hand, the formation of folds which are oriented in a direction which is not substantially perpendicular to the impact force F, and which contains a significant component substantially parallel to said impact force F, denotes that the front floor panel 11 has been stretched during the deformation. The physical explanation of this advantageous stretching behavior of the front floor panel 11 is given here below.

Because the front floor cross member 13 has a greater resistance to plastic deformation than the front floor panel 11, and because said two parts are attached to one another, the physical forces exerted on and the subsequent mechanical deformation of said front floor panel 11 during a side impact are governed by the deformation of said front floor cross member 13. Under the influence of the compressive load generated by the impact force F and the reaction force R, the deformable portion 16 deforms by controlled buckling, which results in a progressive shortening of the length of said deformable portion 16 as measured along a transverse direction. On the other hand, the length of the non-deformable portion 14 as measured along a transverse direction is not affected by the compressive load, but because it is attached to the deformable portion 16, said non-deformable portion 14 travels toward the tunnel 7 following a substantially transverse path during the side impact.

Under the influence of the above described motions of the different portions of the front floor cross member 13, the material of the front floor panel 11 in the tunnel panel portion 26 is compressed during the side impact, while the cross member non-deformable portion 14 prevents compression of the material of the front floor panel 11 in the side sill panel portion 24. Said side sill panel portion 24 is carried away by the motion of the non-deformable portion 14 in a substantially transverse direction toward the tunnel 7. At the same time, the material in the side sill panel portion 24 is attached to the side sill 9 and to other parts, such as the rear floor reinforcement structure 21, the dash panel 19 and other structural parts, such as for example transverse reinforcement elements 18 or for example longitudinal reinforcement elements 28, either directly or indirectly via intermediate parts as described above. Because said structural parts to which the side sill panel portion 24 is attached are not deformed or only slightly deformed during the side impact, the side sill panel portion 24 does not move or hardly moves in the attachment areas during the side impact. In order to accommodate this combined transverse motion toward the tunnel 7 in the area where it is attached to the non-deformable portion 14 and relative lack of motion in the areas of attachment to the other parts than the front floor cross member 13, the material of the side sill panel portion 24 is necessarily submitted to a stretching type of deformation. Advantageously, this stretching deformation of the material of the side sill panel portion 24 ensures a high contribution to the energy absorption of the front floor panel 11 during the side impact.

In a particular embodiment, the length ratio between the non-deformable portion 14 and the total length of the front floor cross member 13, as measured in the transverse direction, is comprised in the range of 40% to 90%. Advantageously, fixing a minimum length ratio of 40% ensures that the front floor cross member 13 plays an important anti-intrusion role during a side impact, thanks to the fact that at least 40% of the length of the part is not deformed during the side impact. Furthermore, because the above described stretching deformation of the front floor panel 11 is actually localized within the side sill panel portion 24, whose length in the transverse direction is the length of the non-deformable portion 14, fixing a minimum length ratio of 40% also ensures a minimum area to the side sill panel portion 24 and therefore ensures that the stretching deformation of the front floor panel 11 during the side impact occurs over a significant area, thereby advantageously contributing to the overall energy absorption behavior of the front floor reinforcement structure 1. On the other hand, limiting the length ratio to 90% leaves a minimum of 10% of the length of the front floor cross-member 13 to the cross member deformable portion 16. Advantageously, conferring a minimum length to the cross member deformable portion 16 ensures that the front floor cross member 13 plays an important energy absorption role during a during a side impact, thanks to the fact that at least 10% of the length of the part can absorb energy by controlled buckling under the influence of the compressive load. Furthermore, conferring a minimum length to the cross member deformable portion 16 also ensures that the above described transverse motion of the cross member non-deformable portion 14 during the side impact is significant and therefore ensures a good stretching behavior of the front floor panel 11, thereby advantageously further contributing to the energy absorption behavior of the front floor reinforcement structure 1.

It should be noted that the above described stretching behavior of the front floor panel 11 during a side impact would not take place if the front floor cross member 13 consisted only of a cross member deformable portion 16. In this case, the entire surface of the front floor panel 11 would be submitted to a compressive deformation by the controlled buckling movement of the cross member deformable portion 16 and there would be no element keeping the front floor panel 11 from being compressed on its entire surface. Therefore, the front floor panel 11 would accommodate the compressive load by buckling, with the formation of folds oriented in a substantially perpendicular direction to the impact force F. Such a deformation would absorb a far lower amount of energy than the stretching behavior made possible by the current invention.

On the other hand, if the front floor cross member 13 consisted only of a cross member non-deformable portion 14, the front-floor panel 11 would be maintained in its original shape by the front floor cross member 13 and would hardly be deformed, thereby absorbing no energy of the crash.

It should be further noted that the above described stretching behavior of the front floor panel 11 during the side impact would not take place if the positions of the cross member deformable portion 16 and the cross member non-deformable portion 14 were inverted. In other words, the stretching behavior would not be observed if the resistance to plastic deformation of the portion of the front floor cross member 13 located closest to the side sill 9 was lower than the resistance to plastic deformation of the portion of the front floor cross member 13 located closest to the tunnel 7. In such a case, under the effect of the compressive load, the portion of the front floor cross member 13 located closest to the side sill 9 would deform by controlled buckling, while the portion of the front floor cross member 13 located closest to the tunnel 7 would essentially retain its initial shape. The portion of the front floor panel 11 located toward the side sill 9 would be carried away into a compressive deformation by the controlled buckling movement of the portion of the front floor cross member 13 located closest to the side sill 9 and the portion of the front floor panel 11 located closest to the tunnel 7 would essentially retain its shape. Contrary to the current invention, the portion of the front floor cross member 13 having the highest resistance to plastic deformation will not travel in a transverse motion during the side impact. The front floor panel 11 will therefore not be submitted to the combined influence of a transverse motion of a portion of the front floor cross member 13 and a relative lack of motion of the other parts to which it is attached. As a result, the front floor panel 11 will not exhibit a stretching behavior. Implementing such a design will result in a far weaker energy absorption contribution of the front floor panel 11 than is the case in the current invention.

During a side impact, at the onset of the impact, the impact force F exerted by the impactor is concentrated on the side sill 9 and its neighboring region. Similarly, the ensuing reaction force R is concentrated on the tunnel 7 and its neighboring region. Because of this very high stress concentration during the onset of the impact, there is a risk of crack formation at both extremities of the front floor cross member 13. In a particular embodiment, as depicted on FIG. 2, the front floor reinforcement structure 1 is equipped with a side sill reinforcement part 15, which is attached to the side sill 9. Advantageously, said side sill reinforcement part 15 absorbs part of the localized stress concentration at the onset of the impact due to the influence of the impact force F, thereby minimizing the risk of crack formation in the area of the front floor cross member 13 located nearest to the side sill 9. In a particular embodiment, as depicted on FIG. 2, the front floor reinforcement structure 1 is equipped with a tunnel reinforcement part 17, which is attached to the tunnel 7. Advantageously, said tunnel reinforcement part 17 absorbs part of the localized stress concentration at the onset of the impact due to the influence of the reaction force R, thereby minimizing the risk of crack formation in the area of the front floor cross member 13 located nearest to the tunnel 7.

According to a particular embodiment as depicted in FIG. 4, the cross member non-deformable portion 14 further comprises a reinforced non-deformable portion 36 and a non-reinforced non-deformable portion 37. At the onset of the impact, the stress concentration will be located in the reinforced non-deformable portion 36, which is located closest to the side sill 9. Advantageously, the fact that said reinforced non-deformable portion 36 has a higher resistance to plastic deformation than said non-reinforced non-deformable portion 37 minimizes the risk of crack formation in the cross member non-deformable portion 14 during a side impact.

In a particular embodiment of the current invention, the front floor panel 11 is made of steel having a yield strength above 210 MPa. Advantageously, because the front floor panel 11 is stretched during a side impact, increasing the yield strength of said front floor panel 11 will increase the energy absorbed by said front floor panel 11 during the side impact. For example, the front floor panel 11 is made of a Dual Phase steel such as HCT450X according to the EuroNorm EN 10346, having a thickness in the range of 0.6 mm to 0.9 mm.

In a particular embodiment of the current invention, the non-deformable portion 14 of the front floor cross member 13 is made of a press-hardening steel having a tensile strength greater than 1300 MPa. According to an embodiment, the steel composition of the non-deformable portion 14 comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \cdot 0.004\%$, the remainder being iron and unavoidable impurities resulting from the steel elaboration process. With this composition range, the tensile strength of the non-deformable portion 14 after press-hardening is comprised between 1300 and 1650 MPa. For example, the non-deformable portion 14 is made of Usibor 1500®. For example, the non-deformable portion 14 has a thickness comprised in the range of 1.4 mm to 1.6 mm.

In a particular embodiment of the current invention, the non-reinforced non-deformable portion 37 of the front floor cross member 13 is made of a press-hardening steel having a tensile strength greater than 1300 MPa. According to an embodiment, the steel composition of the non-reinforced non-deformable portion 37 comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, 0.020%≤Al≤0.060%, S≤0.005%, P≤0.025%, 0.002%≤B≤0.004%, the remainder being iron and unavoidable impurities resulting from the elaboration. With this composition range, the tensile strength of the non-reinforced non-deformable portion 37 after press-hardening is comprised between 1300 and 1650 MPa. For example, the non-reinforced non-deformable portion 37 is made of Usibor 1500®. For example, the non-reinforced non-deformable portion 37 has a thickness comprised in the range of 1.4 mm to 1.6 mm.

In a particular embodiment of the current invention, the reinforced non-deformable portion 36 of the front floor cross member 13 is made of a press-hardening steel having a tensile strength greater than 1800 MPa. For example, the steel composition of the reinforced non-deformable portion 36 comprises, in % weight: 0.24%≤C≤0.38%, 0.40%≤Mn≤3%, 0.10%≤Si≤0.70%, 0.015%≤Al≤0.070%, ≤Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the reinforced non-deformable portion 36 after press-hardening is higher than 1800 MPa. For example, the reinforced non-deformable portion 36 is made of Usibor 2000®. For example, the reinforced non-deformable portion 36 has a thickness comprised in the range of 1.4 mm to 1.6 mm.

In a particular embodiment of the current invention, the deformable portion 16 of the front floor cross member 13 is made of a press-hardening steel having a tensile strength greater than 500 MPa, a fracture strain of at least 0.6 and a critical bending angle of at least 75°. For example, the composition of such steel may comprise, in % weight: 0.04%≤C≤0.1%, 0.3%≤Mn≤2%, Si≤0.3%, Ti≤0.08%, 0.015%≤Nb≤0.1%, Al≤0.1%, S≤0.05%, P≤0.1%, less than 0.1% of Cu, Ni, Cr and Mo, the remainder being iron and unavoidable impurities resulting from the elaboration. With this composition range, the tensile strength of the deformable portion 16 after press-hardening is greater than 500 MPa. For example, the deformable portion 16 is made of Ductibor 500®. For example, the deformable portion 16 has a thickness comprised in the range of 1.5 mm to 1.7 mm.

The front floor reinforcement structure for a vehicle having a battery pack in the tunnel described above presents multiple advantages among which the possibility to involve the side sill panel portion in the energy absorption of the crash during a side impact. The following is a description of the method for producing such a front floor reinforcement structure.

The method comprises a step of providing a front floor panel 11. For example, the front floor panel 11 is made by cold stamping of a sheet metal blank.

The method further comprises a step of providing a tunnel 7. For example, the tunnel is made by welding together several different parts which are individually made by stamping or by bending.

The method further comprises a step of providing a side sill 9. For example, the side sill 9 is made by welding together several different parts which are individually made by stamping or by bending.

The method further comprises a step of providing a front floor cross member 13. According to a particular embodiment, the front floor cross member 13 is made by hot stamping a tailor welded blank or a tailor rolled blank having a first portion corresponding to the non-deformable portion 14 after hot stamping and a second portion corresponding to the deformable portion 16 after hot stamping. According to a particular embodiment, the front floor cross member 13 is made by hot stamping a tailor welded blank or a tailor rolled blank having a first portion corresponding to the reinforced non-deformable portion 36 after hot stamping, a second portion corresponding to the non-reinforced non-deformable portion 37 after hot stamping and a third portion corresponding to the deformable portion 16 after hot stamping.

The method further comprises a step of attaching said tunnel 7, said side sill 9 and said front floor cross member 13 to said front floor panel 11. For example, the tunnel 7 is attached by welding tunnel flanges 10 to the front floor panel 11. For example, the front floor cross member 13 is attached by welding cross member flanges 20 to the front floor panel 11.

According to a particular embodiment, the method further comprises a step of providing a side sill reinforcement part 15 and a step of attaching said side sill reinforcement part 15 to the side sill 9. For example, the side sill reinforcement part 15 is made by stamping or bending. For example, the side sill reinforcement part is attached by welding side sill reinforcement flanges 30 to the side sill 9.

According to a particular embodiment, the method further comprises a step of providing a tunnel reinforcement part 17 and a step of attaching said side tunnel reinforcement part 17 to the tunnel 7. For example, the tunnel reinforcement part 17 is made by stamping or bending. For example, the tunnel reinforcement part 17 is attached by welding tunnel reinforcement flanges 40 to the tunnel 7.

According to a particular embodiment, the method further comprises a step of providing at least one transverse reinforcement element 18 and a step of attaching said transverse reinforcement element 18 to the front floor panel 11. For example, said transverse reinforcement element 18 is made by stamping or bending. For example, the transverse reinforcement element 18 is attached by welding onto said front floor panel 11.

According to a particular embodiment, the method further comprises a step of providing at least one longitudinal reinforcement element 18 and a step of attaching said longitudinal reinforcement element 18 to the front floor panel 11. For example, said longitudinal reinforcement element 18 is made by stamping or bending. For example, the longitudinal reinforcement element 18 is attached by welding onto said front floor panel 11.

What is claimed is:

1. A front floor reinforcement structure for a vehicle having a battery pack in a tunnel comprising:
   a front floor panel;
   a front floor cross member extending in a transverse direction from a side sill to the tunnel and being attached at least to the front floor panel;
   the front floor cross member including a non-deformable portion located on a first end of the front floor cross member closest to the side sill and a deformable portion located on a second end of the front floor cross member closest to the tunnel, a resistance to plastic deformation of the non-deformable portion being greater than a resistance to plastic deformation of the deformable portion and the resistance to plastic deformation of the deformable portion being greater than a resistance to plastic deformation of the front floor panel.

2. The front floor reinforcement structure as recited in claim 1 wherein the front floor cross member consists of the deformable portion and the non-deformable portion.

3. The front floor reinforcement structure as recited in claim 1 wherein the non-deformable portion of the front floor cross member has a length, as measured in the transverse direction, of 40% to 90% of a total length of the front floor cross member.

4. The front floor reinforcement structure as recited in claim 1 wherein the non-deformable portion of the front floor cross member includes a reinforced non-deformable portion located at the first end and a non-reinforced non-deformable portion located at an end of the non-deformable portion closest to the tunnel, a resistance to plastic deformation of the reinforced non-deformable portion being greater than a resistance to plastic deformation of said non-reinforced non-deformable portion.

5. The front floor reinforcement structure as recited in claim 1 wherein the non-deformable portion of the front floor cross member has an ultimate tensile strength of at least 1300 MPa.

6. The front floor reinforcement structure as recited in claim 1 wherein the deformable portion of the front floor cross member has a tensile strength of at least 500 MPa, a fracture strain of at least 0.6 and a critical bending angle of at least 75°.

7. The front floor reinforcement structure as recited in claim 1 wherein the front floor cross member is hot stamped from a steel tailor welded blank.

8. The front floor reinforcement structure as recited in claim 1 wherein the front floor cross member is hot stamped from a steel tailor rolled blank.

9. The front floor reinforcement structure as recited in claim 1 wherein the front floor panel has a yield strength of at least 210 MPa.

10. The front floor reinforcement structure as recited in claim 1 further comprising a side sill reinforcement part located above the front floor cross member and extending in a transverse direction from the side sill toward the tunnel, wherein the side sill reinforcement part is attached to the side sill.

11. The front floor reinforcement structure as recited in claim 1 further comprising a tunnel reinforcement part located above the front floor cross member and extending in the transverse direction from the tunnel toward the side sill, wherein the tunnel reinforcement part is attached to the tunnel.

12. A method of manufacturing the front floor reinforcement structure as recited in claim 1, the method comprising the steps of:
   providing the front floor panel;
   providing the tunnel;
   providing the side sill;
   providing the front floor cross member; and
   attaching the tunnel, the side sill, and the front floor cross member to the front floor panel.

13. The method as recited in claim 12 further comprising the steps of providing a side sill reinforcement part and attaching the side sill reinforcement part to the side sill.

14. The method as recited in claim 12 further comprising the steps of providing a tunnel reinforcement part and attaching the tunnel reinforcement part to the tunnel.

* * * * *